UNITED STATES PATENT OFFICE.

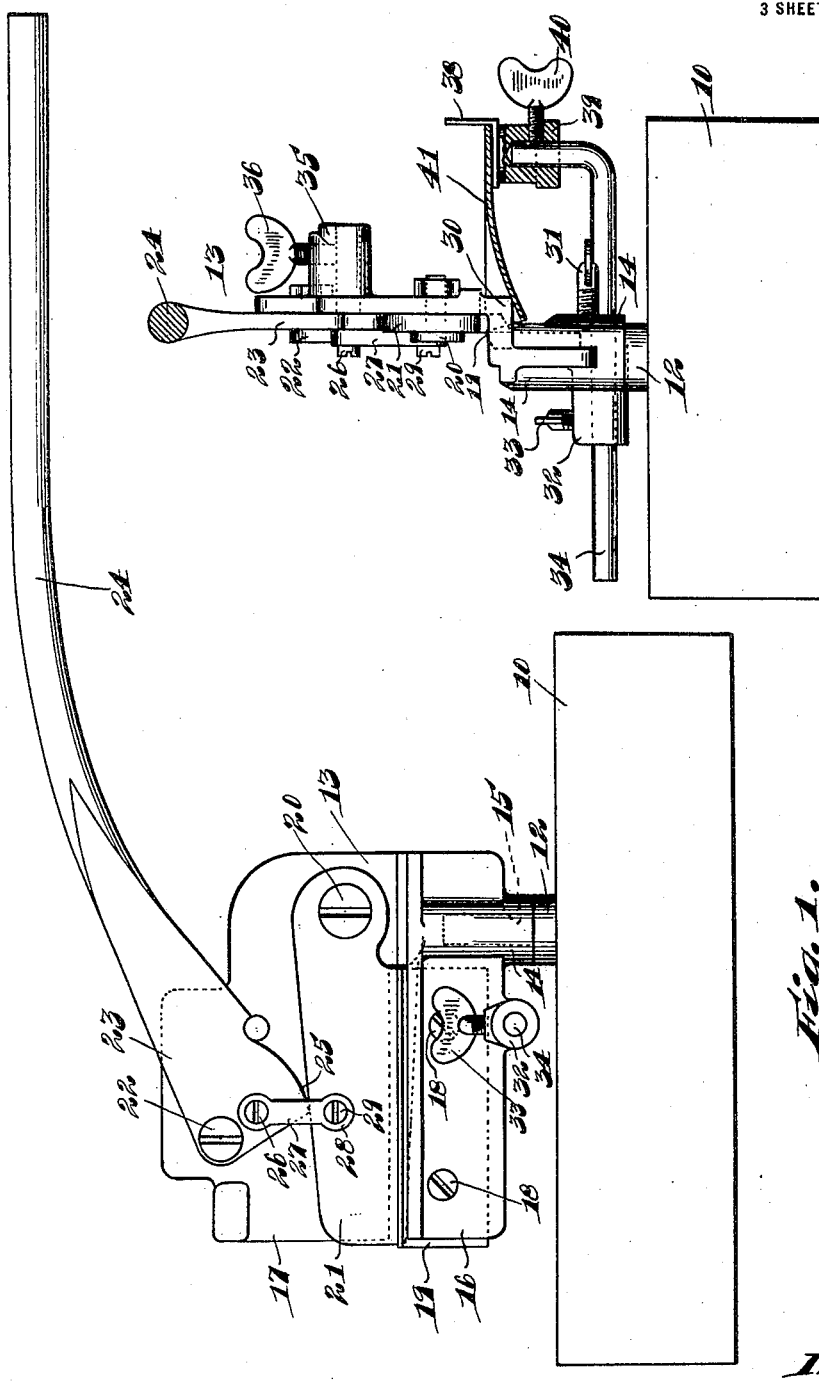

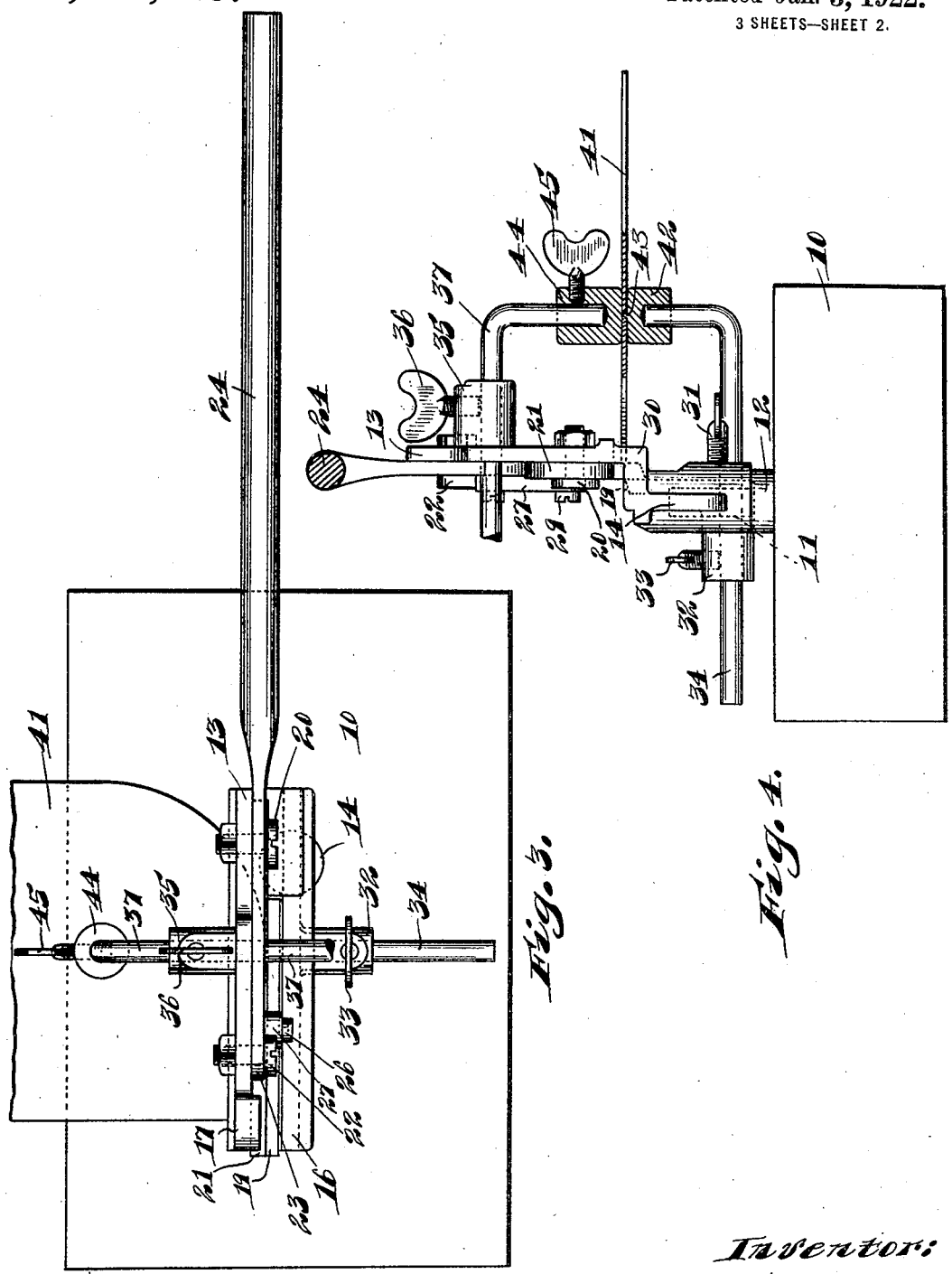

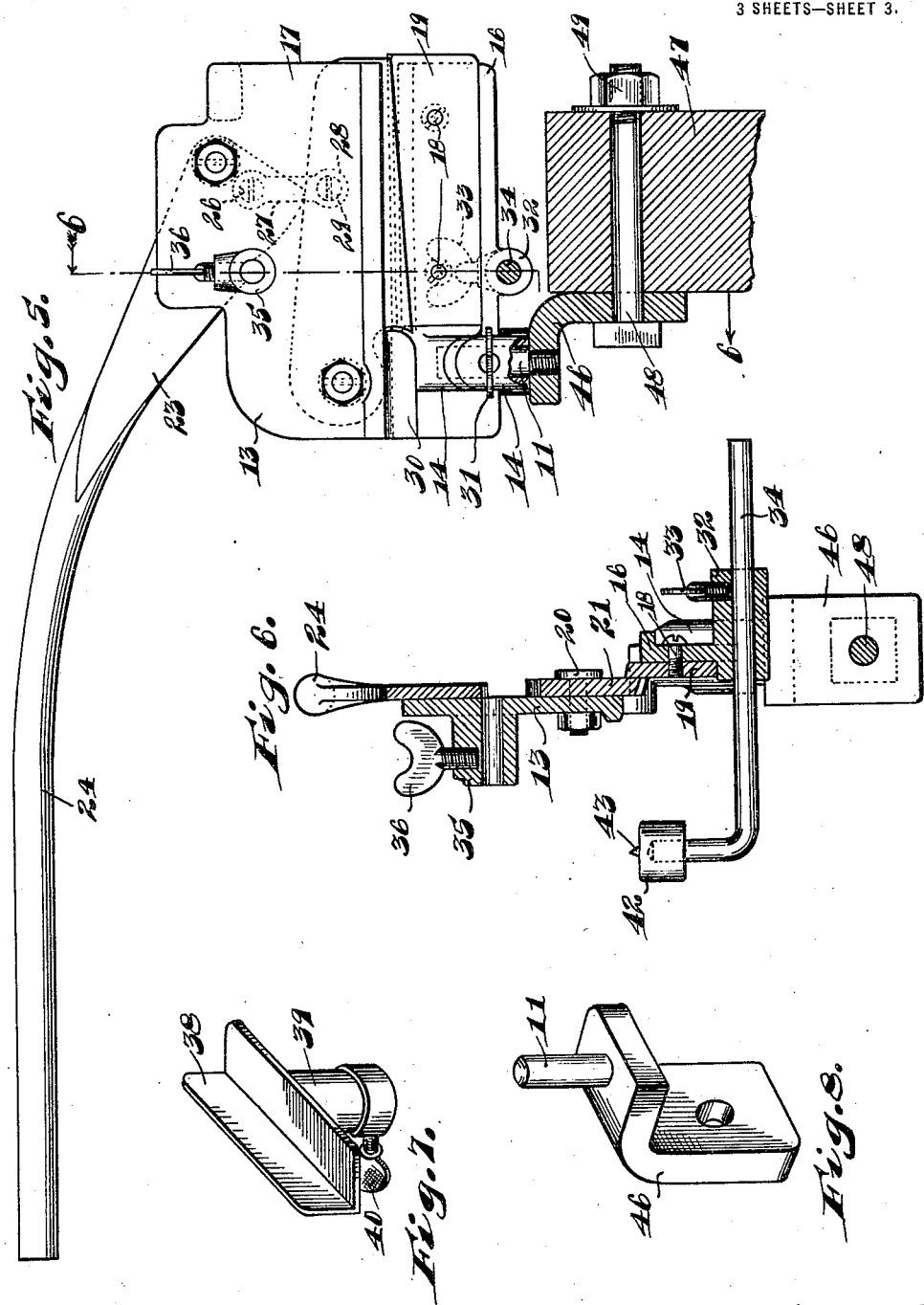

ERNST SCHMITZ, OF CHICAGO, ILLINOIS.

TIN-CUTTING DEVICE.

1,402,019.

Specification of Letters Patent.   Patented Jan. 3, 1922.

Application filed July 14, 1919.   Serial No. 310,616.

*To all whom it may concern:*

Be it known that I, ERNST SCHMITZ, a citizen of the United States, and a resident of the city of Chicago, county of Cook, and State of Illinois, have invented certain new and useful Improvements in Tin-Cutting Devices, of which the following is a specification.

My invention relates to new and useful improvements in a tin cutting device, and has for its object the provision of a tin cutting device which will be durable in structure and efficient in use. A further object is the provision of a tin cutting device whereby a powerful leverage may be exerted upon the cutting elements.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevational view of my invention.

Fig. 2 is a rear elevational view of my invention, with attachment applied.

Fig. 3 is a top plan view of my invention with attachment applied.

Fig. 4 is a rear elevational view of the device shown in Fig. 3 with parts in section.

Fig. 5 is a side elevational view of my invention showing attachment applied.

Fig. 6 is a vertical sectional view taken on substantially line 6—6 of Fig. 5.

Fig. 7 is a perspective view of one of the attachments.

Fig. 8 is a perspective view of one of the attachments.

The device is intended primarily to be mounted upon a base 10, upwardly projecting from which is a suitable stud or post 11, having adjacent the upper surface of the member 10 a suitable rest embodied in the collar 12. A frame 13 is provided which has downwardly projecting from the under surface a socket member 14, which is provided with a suitable opening 15 for the reception of the cylindrical post 11. When mounted in this manner, the frame 13 is thereby rotatably mounted upon the shaft or post 11. The member 13 consists of two stationary jaws 16 and 17. These members 16 and 17 lie in planes which are parallel, but spaced apart. The uper edge of the member 16 lies in a plane which is spaced apart from the plane in which the lower edge of the member 16 lies. Securely fastened to the member 16 by suitable fastening means 18 is a cutting element 19 having the upper edge thereof inclined upwardly toward a cooperating cutting element 21 which is pivotally mounted upon the frame 13 by means of a suitable bolt or rivet 20. The cutting edge of the cutting element 21 is inclined downwardly toward the adjacent cooperating cutting element 19. The combined widths of the cutting elements 19 and 21 are equal to the space between the parallel planes in which the members 16 and 17 lie, so that the cutting elements may overlap at their cooperating edges with a very close fit. Pivotally mounted upon the member 17 by means of a suitable bolt 22 adjacent the upper edge of an enlarged portion 23, is a lever 24 The opposite corner 25 of the enlarged portion 23 is adapted, when the outer end of the lever 24 is moved downward, to contact with the upper edge of the cutting element 21. Pivotally mounted upon the enlarged portion 23 by means of a suitable pin or bolt 26, at one end is a link 27, the opposite end 28 of which is pivotally mounted upon the cutting element 21 by means of a suitable pin or bolt 29. Projecting downwardly from the under surface of the member 17 at the rear end thereof, is a suitable shoulder 30. When the device is used for cutting tin, this shoulder 30, which is rounded at the forward end thereof, is adapted to engage on its upper surface the portion of the tin being cut which extends on that side of the device. The rest of the material being cut which extends on the opposite side of the device is adapted to slide over the upper edge of the member 16. This consequently results in a downward flexing of one portion of the material on one side of the device from the other portion of the material on the opposite side of the device, thereby completely and positively separating the cut portion of the material and retaining it separated from the rest of the material, resulting in advantages which are readily apparent to one skilled in this art. Projecting into the socket member 14 is a suitable locking device, preferably a set screw or thumb screw 31, for the purpose of locking the device against rotation upon the member 11, while being operated. Projecting laterally from the jaw 16 is a suitable bearing member 32 having a circular opening therethrough. Projecting into the interior of the member 32 is a thumb screw or other locking member, for the purpose of locking the member 34 which is inserted in the member 32 against rotation therein. Projecting from the opposite side of the device, laterally from the member 17, is a suitable bearing member 35 having an opening therein for the reception of a cylindrical member 37. Projecting into the opening in the member 35 is a suitable locking element 36 for the purpose of locking the element 37 against rotation therein.

This device is designed primarily for the purpose of cutting tin and sheet metal and is intended to perform in a more efficient and satisfactory manner the work of the usual shear which is used upon this kind of material. It is sometimes desirable to have a suitable gauge for measuring the width of the material being cut, in order that the width of the piece may be constant throughout its length. I have provided such a device which is adapted to seat upon the upturned end of the member 34. This member consists of an angle iron portion 38, projecting downwardly from which is a suitable socket member 39 adapted to seat upon the upturned end of the member 34. A suitable locking member 40 prevents the rotation of this member upon the upturned end of the member 34, as shown in Fig. 2. In the use of this gauge member, the sheet metal 41 is adapted to lie against the upwardly extending portion of the angle iron member 38, the opposite edge of the metal 41 being flexed downwardly by the shoulder 30, already described.

Another attachment which is designed to be used with my invention, comprises a means of cutting a circle out of the material desired to be used. A suitable drum member 42 having a socket therein is adapted to seat upon the upturned portion of the member 34. A tit 43 projects upwardly from the central portion of the upper surface of the member 42. It is apparent that the member 42 is rotatably mounted upon the upwardly turned end of the member 34. An additional drum member 44 is provided which has a socket therein for the reception of the downwardly turned end of the member 37, as shown in Fig. 4. A suitable locking element 45 secures the drum 44 upon the downwardly turned end of the member 37 in its adjusted position. The lower face of the member 44, when in operative position, is smooth. In the use of these attachments, the material out of which the circle is to be cut, is positioned upon the member 42, the member 43 being positioned at the center of the circle desired to be cut. The member 44 is then mounted upon the downwardly turned end of the member 37, and the lower face therein is positioned adjacent the upper surface of the material to be cut, and then securely locked in position by the locking element 45. The material can then be rotated about the point 43 as a center, the circumference of the circle being tangent to the two cooperating surfaces of the cutting elements.

In the use of this device, a stationary stud or post 11 may be used, which is mounted upon the base 10, as already described. It may sometimes be necessary, however, to use the device at different places and in different positions, and to provide for the use of this device at different places and in different positions, I have provided a bracket 46 which has upwardly extending therefrom a suitable post 11. The member 46 is designed to be secured to any suitable object 47 by means of a bolt 48 and cooperating nut 49. By the use of this bracket 46, the use of my invention is not limited to any particular place, as the bearing post 11 can be mounted at different places.

In my invention I have provided, as already shown, a means of cutting tin, which is highly efficient inasmuch as the leverage exerted upon the material being cut, is transmitted by means of the lever 24 and the link 27, thereby increasing the pressure which may be exerted upon the member 21 over that which might be exerted were the lever 24 to operate upon the member 21 solely.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. A device of the class described comprising a pivotally mounted frame having a downwardly projecting socket member; a bore in said socket member; a shaft engaging said bore and supporting said frame; co-operating cutting elements mounted on said frame; and a lever pivotally mounted on said frame, the end of said lever, adjacent the pivot point, broadened out forming a cam shaped edge, said cam shaped edge adapted to engage the upper edge of one of the said cutting elements forcing the same into cutting position by an upward movement of said lever, substantially as described.

2. In combination with a cutting device having a pivotally mounted frame; co-operating cutting elements mounted on said frame; a lever for actuating said cutting elements; bearings mounted on said frame and projecting laterally therefrom; clamping members adjustably mounted on said bearings; and means mounted on one of said clamping members adapted to engage the surface of a strip of material positioned between said clamping members, substantially as described.

3. In combination with a cutting device having a pivotally mounted frame; co-operating cutting elements mounted on said frame; a lever for actuating said cutting elements; bearings mounted on said frame and projecting laterally therefrom; supporting members adjustably mounted on said bearings; clamping members removably mounted on one end of each of the said supporting members; and a penetrating point mounted on one of said clamping members adapted to engage the surface of a strip of material positioned between said clamping members, substantially as described.

4. In combination with a cutting device having a pivotally mounted frame; co-operating cutting elements mounted on said frame; a lever for actuating said cutting elements; bearings mounted on said frame and projecting laterally therefrom; an angular shaped supporting member adjustably mounted on each of said bearings; clamping members removably mounted on one end of each of said supporting members; and a penetrating point mounted on one of said clamping members adapted to engage the surface of a strip of material positioned between said clamping members, substantially as described.

In testimony whereof I have signed my name to this specification in the presence of two subscribing witnesses.

ERNST SCHMITZ.

Witnesses:
JOSHUA R. H. POTTS,
JANET E. FARRELL.